United States Patent

Yoshimi

[11] Patent Number: 5,800,885
[45] Date of Patent: Sep. 1, 1998

[54] BLOW MOLDED POLYALCOHOL CONTAINER

[75] Inventor: Kazuyori Yoshimi, Kurashiki, Japan

[73] Assignee: Kuraray Co., Ltd., Kurashiki, Japan

[21] Appl. No.: 924,214

[22] Filed: Sep. 5, 1997

[30] Foreign Application Priority Data

Sep. 18, 1996 [JP] Japan .................. 8-245903

[51] Int. Cl.⁶ .................. B29D 22/00; C08G 67/02
[52] U.S. Cl. .................. 428/35.7; 528/220; 528/392; 528/425; 525/539; 428/35.9
[58] Field of Search .................. 528/220, 392, 528/425; 525/539; 428/35.7, 35.9

[56] References Cited

U.S. PATENT DOCUMENTS

| | | | |
|---|---|---|---|
| 4,868,254 | 9/1989 | Wong | 525/539 |
| 4,904,759 | 2/1990 | Drent | 528/392 |
| 4,925,918 | 5/1990 | Brown et al. | 528/392 |
| 4,940,758 | 7/1990 | Wong | 525/539 |
| 5,071,926 | 12/1991 | Drent | 525/539 |
| 5,138,032 | 8/1992 | Mastenbroek et al. | 528/392 |

FOREIGN PATENT DOCUMENTS

| | | |
|---|---|---|
| 2-232228 | 9/1990 | Japan . |
| 6-226925 | 8/1994 | Japan . |
| 6-255057 | 9/1994 | Japan . |

*Primary Examiner*—Samuel A. Acquah
*Attorney, Agent, or Firm*—Oblon, Spivak, McClelland, Maier & Neustadt, P.C.

[57] ABSTRACT

A blow molded multilayered container comprises a layer of a polyalcohol obtained by reduction of a polyketone comprising carbon monoxide-ethylene copolymer and a layer of a thermoplastic resin other than polyalcohol, said polyalcohol having an intrinsic viscosity of 0.3 to 3.0 dl/g, a melting point of 110° to 160° C., a density of 1.12 to 1.21 g/cm³ and a tetrahydrofuran ring content of not more than 10 mole %.

7 Claims, No Drawings

BLOW MOLDED POLYALCOHOL CONTAINER

BACKGROUND OF THE INVENTION

1. Field of the Invention

The present invention relates to blow molded containers having good blow moldability and excellent falling strength, moisture-proofness and gas barrier properties.

2. Description of the Prior Art

Polyalcohols (hereinafter referred to as "PAL"s) obtained by reduction of polyketones (hereinafter referred to as "PK"s) are known to have good gas barrier properties. See, for example, Japanese Patent Application Laid-open Nos. 204929/1989 (U.S. Pat. Nos. 4,868,254, 4,940,758 and 5,071,926), 149828/1989 (U.S. Pat. No. 4,904,759) and 232228/1990. Packaging materials comprising films of PAL laminated with another thermoplastic resin are also known. See, for example, Japanese Patent Application Laid-open Nos. 226925/1994 and 255057/1994.

However, these literature do not disclose or suggest any blow molded container comprising PAL alone or any blow molded multilayered container comprising PAL and a thermoplastic resin other than PAL.

The present inventor has studied blow molding of PAL into hollow containers, and found that PAL has poor blow moldability and that the obtained hollow containers have the problems of poor strength at their pinch-off part and poor falling strength and, further, poor moisture-proofness due to large moisture permeability.

The present inventor has also made a study on blow molded containers comprising a PAL and, laminated therewith, a thermoplastic resin other than PAL. It has then been found that simple lamination-blow molding of a combination of a PAL and another thermoplastic resin yields containers still having insufficient strength at pinch-off part and insufficient falling strength. They are also of poor lamination-blow moldability. It is therefore necessary to solve these problems, in order to obtain blow molded containers usable in practice.

SUMMARY OF THE INVENTION

Accordingly, an object of the present invention is to provide a blow molded container comprising a PAL and having excellent blow moldability, appearance, falling strength, moisture-proofness and gas barrier properties.

The blow molded containers referred to in the invention are not limited to those obtained by direct blow molding, but include those by pipe blow molding, pipe stretching blow molding, injection blow molding and injection stretching blow molding.

According to a study made by the present inventor, the above problems can be solved by providing a blow molded container comprising a PAL obtained by reduction of a PK comprising carbon monoxide-ethylene copolymer, said PAL having an intrinsic viscosity of 0.3 to 3.0 dl/g, a melting point of 110° to 160° C., a density of 1.12 to 1.21 g/cm³ and a tetrahydrofuran ring (hereinafter referred to as "THF ring") content of not more than 10 mole %.

The present invention also provides a blow molded multilayered container comprising the above PAL and, laminated therewith, a thermoplastic resin other than PAL.

DETAILED DESCRIPTION OF THE PREFERRED EMBODIMENTS

The PAL used in the invention is obtained by reduction of a polyketone comprising a carbon monoxide-ethylene copolymer and is, in particular, preferably selected from those comprising at least 80% of repeating units each represented by the following formula (I) in view of gas barrier properties. The repeating units are more preferably present in the polymer in an amount of at least 90%, most preferably at least 95%.

The carbon monoxide-ethylene copolymer typically includes those obtained by copolymerizing carbon monoxide and ethylene and, also, those consisting essentially of carbon monoxide-ethylene copolymer and being copolymerized with an unsaturated compound other than ethylene. Examples of the unsaturated compound are olefins having 3 to 12 carbon atoms, dienes having 4 to 12 carbon atoms, vinyl esters, aliphatic unsaturated carboxylic acids and anhydrides, salts and esters thereof.

Although carbon monoxide-ethylene copolymers in general include random copolymers and alternating copolymers, it is desirable to select alternating ones, which result in a polymer product having the desired functions and effects of a polymer of the invention.

Examples of the above olefins having 3 to 12 carbon atoms are propylene, butene-1, isobutene, pentene-1, 4-methylpentene-1, hexene-1, octene-1 and dodecene-1. Among these, propylene is preferred.

Examples of the dienes having 4 to 12 carbon atoms are butadiene, isoprene, 1,5-hexadiene, 1,7-octadiene and 1,9-decadiene. Examples of the vinyl esters are vinyl acetate, vinyl propionate and vinyl pivalate.

Examples of the aliphatic unsaturated carboxylic acids are acrylic acid, methacrylic acid, maleic acid and itaconic acid.

These ethylene-carbon monoxide copolymers can be produced by any known process, e.g. those described in Japanese Patent Application Laid-open Nos. 197427/1984, 91226/1986, 232434/1987, 225027/1992, 131629/1989, 298929/1994, 165909/1995, 295107/1993, 301956/1993 and 292099/1995, but the process of manufacture is not limited to these methods.

Examples of suitable processes for reducing the carbonyl groups of the PK to obtain the corresponding PAL are those which comprise partially or wholly reducing the carboxyl groups present in the PK with hydrogen or the like, as described in, for example, Japanese Patent Application Laid-open Nos. 232228/1990, 339367/1993 and 49203/1994, or those which comprise partially or wholly reducing the carboxyl groups of the PK by treatment with a metal hydride, as described in, for example, Japanese Patent Application Laid-open No. 204929/1989.

The features of the PAL used in the invention are influenced, not only by the conditions employed on its production, but by conditions for processing the PAL, such as stretching and heat treating conditions. It is therefore important to select these conditions appropriately.

Means for solving the problem of the present invention are now described in detail.

On the blow molding of containers, it is necessary that parisons undergo only little drawdown on blow molding, thereby exhibiting good blowability, and that the obtained containers have little thickness unevenness, streaks, gels or fish-eyes, thus having good appearance.

Where a PAL and another thermoplastic resin are laminated with each other and blow molded, it is possible to improve drawdown tendency to some extent, but only insufficiently, by adjusting the melt viscosity of the thermoplastic resin used in combination. It is therefore necessary to design a PAL suitable for blow molding.

Drawdown is generally prevented by increasing the intrinsic viscosity and melt viscosity of the resin used. With PALs, however, increasing the intrinsic viscosity and melt viscosity will, while improving the drawdown tendency though, worsen the blowability. In this case, the obtained blow molded containers tend to have some thickness unevenness, streaks, gels and fish-eyes.

As a result of an intensive study on this point, it has been found that the problems can be solved by adjusting within a specific range the intrinsic viscosity of the PAL used and limiting the maximum content of THF rings in the PAL molecule to a specific level or, desirably, adjusting the THF ring content within a specific range.

That is, in the present invention, the PAL used has an intrinsic viscosity of 0.3 to 3.0 dl/g, preferably 0.5 to 2.5 dl/g, more preferably 0.7 to 2.0 dl/g and contains a THF ring in an amount of not more than 10 mole %, preferably 0.01 to 10 mole %, more preferably 0.03 to 5 mole %, most preferably 0.05 to 3 mole %.

If the intrinsic viscosity is less than the above range, the drawdown tendency will become large to cause large thickness unevenness. If the intrinsic viscosity exceeds the above range, the extrudability of parison, as well as the blowability, will worsen, so that the obtained blow molded containers tend to have streaks, gels and fish-eyes.

A content of the THF ring of less than 0.01 mole % is not always desirable, since the drawdown tendency will then become large. In this case, the intrinsic viscosity should be increased in order to prevent severe drawdown, which tends to deteriorate the extrudability of parisons and the blowability and appearance. On the other hand, if the content exceeds the above range, the gas barrier properties of the obtained containers will worsen.

The THF ring herein includes 5-member rings containing ether bond, which are represented, for example, by formula (II) and formula (III), and the content of THF ring means the total content of them.

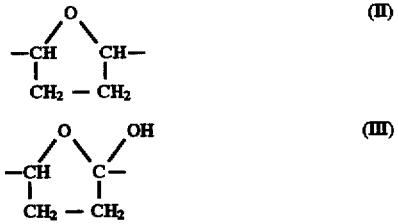

A commercially advantageous method for permitting the THF ring to be present in a PAL is as follows. That is, on reduction of PK, ketone groups present in the polymer are converted into hydroxide groups, which are then reacted with the ketones remaining in the polymer to form THF rings represented by formulas, (II), (III) and the like.

The amount of the THF ring formed can be appropriately adjusted by proper selection of the solvent and temperature used on reduction of PK.

That is, using a solvent for which the PK has a low solubility and setting a high reduction temperature can increase the amount of the THF ring in the resulting PAL. On the other hand, use of a solvent in which the PK has a high solubility and that of a low reduction temperature can suppress formation of the THF ring in the PK.

It is desirable, in order to adjust the content within a relatively narrow range, to employ a low temperature when starting the reduction and then, after the reduction has proceeded to some extent, elevate the temperature.

The content of the THF ring in a PAL can readily be determined by any known process such as NMR spectroscopy.

The falling strength is described next. Simple blow molding of a PAL yields hollow containers with the pinch-off part at their bottom having insufficient strength. The containers therefore will, when dropped from a height, break at the pinch-off parts, thereby exhibiting an insufficient falling strength.

Blow molded containers are required, in general, to have a high falling strength at room temperature. It is necessary that they also have a high falling strength at low temperatures (generally 0° to 10° C.) when they are to be filled with contents requiring low-temperature transportation, such as fresh juice and milk products. It is further necessary that they have a high falling strength at high temperatures (generally 60° to 95° C.) when they are to be filled with contents requiring hot packaging, such as hot ketchup, sauce or the like, This is because they are, after being hot packed with such contents, conveyed through production line at a high speed and packaged in boxes, while the contents have not cooled down sufficiently, in order to increase productivity.

For the above requirements, blow molded PAL containers are, as described above, insufficient not only in the falling strength at room temperature, but also, and more markedly, in that at low and high temperatures.

The above disadvantage can be improved to some extent by laminating PAL with a thermoplastic resin other than PAL. However, simple lamination of PAL with another thermoplastic resin cannot result in a sufficient falling strength.

To solve this problem, it is necessary that the PAL used have a melting point of 110° to 160° C., preferably 115° to 155° C., more preferably 120° to 150° C., and that the same have a THF ring content of, same as above, not more than 10 mole %, preferably 0.01 to 10 mole %, more preferably 0.03 to 5 mole %, most preferably 0.05 to 3 mole %.

If the melting point is less than the above range or if the THF ring content exceeds the above range, the pinch-off part will have a low strength particularly at high temperatures, which leads to insufficient falling strength, and the gas barrier properties will deteriorate. On the other hand, if the melting point exceeds the above range, a sufficient falling strength cannot be obtained. A THF ring content of less than 0.01 mole % is not always desirable, since the strength of pinch-off part will then tend to decrease particularly at low temperatures, thereby decreasing the falling strength.

Although the melting point of a PAL is mostly fixed by the basic molecular structure of the PAL, it can still be adjusted by the following methods. The melting point can be raised to the purpose of the present invention by, for example, increasing the degree of polymerization of the PAL above a certain level; reacting the PAL with a specific compound, e.g. silanes such as vinyltrimethoxysilane and vinyldimethylmethoxysilane, boron compounds such as boric acid, isocyanates, dialdehydes and like crosslinking agents; or employing combinations of the foregoing. The melting point can be readily decreased by, for example, decreasing the degree of polymerization of the PAL below a certain level; copolymerizing, on polymerization of PK, with a comonomer other than carbon monoxide and ethylene, such as an olefin having at least 3 carbon atoms, e.g. propylene and then reducing the copolymer; forming THF rings in the PAL; or employing combinations of the foregoing.

PALs per se have the problem of exhibiting large moisture permeability and having poor moisture-proofness. Although the moisture-proofness can be improved to some extent by lamination with a moisture-proof thermoplastic resin, it is desirable to further increase the moisture-proofness.

PALs per se have good gas barrier properties, which are, when they are used as blow molded containers, desired to be higher.

It is desirable that the blow molded containers according to the present invention have an oxygen transmission rate in cc/m².day.atm (20° C., 75% RH) of not more than 50, preferably not more than 10, more preferably not more than 5.

However, it has been found that, when a PAL is, in order to solve the problems to be solved by the invention, i.e. to improve the blow moldability, appearance and falling strength, modified by, for example, forming a THF ring in the PAL or copolymerizing an unsaturated compound other than ethylene, such as propylene, there generates a new problem that the gas barrier properties and moisture-proofness worsen.

This new problem can be solved by adjusting the density of the PAL in a range of 1.12 to 1.21 g/cm³, preferably 1.15 to 1.20 g/cm³, more preferably 1.16 to 1.19 g/cm³.

Too low a density worsens the gas barrier properties and moisture-proofness, while too high a density decreases the strength at pinch-off part and the falling strength.

The density of a PAL can be adjusted by, for example, adjusting the heat treating conditions for the PAL, stretching the PAL, incorporating a crystallization accelerator such as crystalline nucleus agent into the PAL, copolymerizing a comonomer on the main chain of the PAL, graft polymerizing a comonomer with the PAL, reacting with the PAL a compound that can react with the hydroxyl groups of the PAL and crosslinking the PAL with an electron beam or with a crosslinking agent.

Among these methods, adjustment of heat treating conditions is simple and easy. For this purpose, it is most recommendable to adjust the cooling rate of the melted parison extruded from the die or adjust, on blowing the parison, the temperature of the mold and the retaining time in the mold, or to employ both of these methods. These methods are exemplified in the Examples to be shown later herein. That is, with direct blow molding, hot water of for example 40° to 60° C. is circulated through the mold to cool the parison gradually; and with injection blow molding, the injected parison is treated in a temperature conditioning pot the temperature of which is kept at for example 100° to 120° C. and then transferred to the mold for blowing.

With the blow molded PAL containers of the present invention, it is desirable, in order to achieve the object of the present invention sufficiently, that the PAL used be laminated on one side or both sides thereof with a layer of a thermoplastic resin other than PAL. Examples of the thermoplastic resin are polyolefins, polyesters, polystyrene, polyamides, polycarboantes, polyvinyl chloride, polyvinylidene chloride, polyacetals, polyurethanes and ethylene-vinyl alcohol copolymer.

Examples of polyolefins usable for this purpose are polyethylenes (high, medium and low density polyethylenes, super low density polyethylene and linear low density polyethylene), ethylene-propylene copolymer, polypropylene, ionomer, ethylene-vinyl acetate copolymer, ethylene-(meth)acrylic acid copolymer and ethylene-(meth) acrylic acid ester copolymers. Examples of usable polyesters are polyethylene terephthalate and polybutylene terephthalate.

Among these resins, selection of polyolefins or polyesters is preferred, in order to achieve the object of the present invention more sufficiently; and selection of polyolefins is most preferred.

In producing blow molded containers, it is desirable to permit an adhesive resin layer to be present between a layer of the above PAL of the present invention and that of the thermoplastic resin, which prevents interlayer delamination and improves the falling strength. On this occasion, any adhesive resin can be used with no specific limitation, as long as it can firmly bond the two layers. There are, however, preferably used for this purpose: olefins modified by grafting to their side chains or by copolymerizing on their main chain an unsaturated carboxylic acid or its anhydride, salts or esters, such as maleic anhydride-modified polyethylene and ethylene- (meth) acrylic acid copolymer; and dienes such as hydrogenated styrene-butadiene copolymer, liquid butadiene and ethylene-propylene-diene copolymers, modified by grafting an unsaturated carboxylic acid or its anhydride, such as maleic acid or maleic anhydride.

Examples of the layer constitution to be employed are PAL layer/thermoplastic resin layer, PAL layer/thermoplastic resin layer/PAL layer, thermoplastic resin layer/PAL layer/thermoplastic resin layer, thermoplastic resin layer/PAL layer/recovered scrap layer/thermoplastic resin layer, thermoplastic resin layer/recovered scrap layer/PAL layer/recovered scrap layer/thermoplastic resin layer, and those comprising a layer of the above adhesive resin present between two adjacent layers of the foregoing.

The blow molded containers of the present invention are suitably used for packaging foods, drinking water, cosmetics, chemicals, pharmaceuticals, agricultural chemicals, oils and fats, kerosenes, gasoline and like items.

The effects produced by the present invention are summarized as follows.

① improvement of blow moldability and appearance;
② improvement of falling strength;
③ improvement of moisture-proofness and
④ improvement of gas barrier properties.

EXAMPLES

Other features of the invention will become apparent in the course of the following descriptions of exemplary embodiments which are given for illustration of the invention and are not intended to be limiting thereof. In the Examples and Comparative Examples that follow, the characteristic properties are determined and evaluated by the following methods.

Testing Methods for Properties (1) Intrinsic viscosity

Obtained from viscosity measurements carried out on a solution of sample in water-containing phenol (water/phenol=15/85 by weight) with an Ostwald viscosimeter at 30° C.

(2) Melting point

Measured with a differential scanning calorimeter (DSC) (Type RDC220/SSC5200H, made by Seiko Industries, Inc.) at a temperature elevation rate of 10° C./minute. The temperature was calibrated with indium and lead.

(3) Density

Measured with a density gradient tube at a temperature of 25° C. using xylene and carbon tetrachloride as gradient liquids.

The density herein means that of PAL having been formed into a blow molded container.

(4) THF ring content

Determined by NMR spectrometry using deuterated dimethyl sulfoxide as a solvent.

(5) Oxygen transmission rate

An oxygen transmission rate tester (MOCON OX-TRAN 10/50, made by Modern Controls, Inc.) was used. Nitrogen carrier gas was streamed into a blow molded container sample, while its outside was placed under an atmosphere of oxygen. Measurement was made under the conditions of 20° C. and 85% RH, in accordance with JIS K7216 (constant pressure method).

In the present invention, the oxygen transmission rate of a blow molded multilayered container means that of the multilayered body.

Evaluation methods (1) Blow moldability and appearance

There were used a multi-layer direct blow molding machine (TB-ST-6P, made by Suzuki Iron Works; screw diameter: 45 mmø, 40 mmø, 35 mmø and 30 mmø) and an injection stretching blow molding machine (ASB-50T, made by Nissei ASB Machinery; screw diameter: 38 mmø and 19 mmø) for direct blow molding and injection stretching blow molding, respectively, to mold hollow cylindrical containers having an outside diameter of 70 mmø, a body wall thickness of 700 μm and a capacity of 500 ml.

The above multi-layer direct blow molding machine can laminate up to 4 types of resins and also can, as necessary, operate single-layer molding or multi-layer molding of 2 to 3 resins. The above injection stretching blow molding machine can laminate 2 types of resins and also can, as necessary, conduct single-layer molding.

The blow moldability was evaluated based on the state of resin upon blow molding, i.e. drawdown tendency (in the case of injection molding, injection moldability of parison) and blowability of parison. The appearance was evaluated based on the appearance of the obtained containers, i.e. the state of generation of thickness unevenness, streaks, gels and fish-eyes.

(2) Falling strength

A container sample was filled with water and, after being conditioned to a temperature of 3° C., dropped from the height of 2 m onto concrete floor, with its pinch-off part facing downward. The container was then visually checked and evaluated (low-temperature falling strength).

A container sample having been conditioned under 20° C. and 65% RH was allowed to stand for 1 minutes at 20° C. and then dropped from the height of 2 m onto concrete floor, with its pinch-off part facing downward. The container was then visually checked and evaluated (high-temperature falling strength).

For the evaluation, complete condition with no breakage or deformation of pinch-off part was judged as excellent, and even partial breakage of pinch-off part or even a little oozing out of contained water was judged as poor.

(3) Moisture-proofness and food storing capability

A blow moled container sample was filled with dry peeled peanuts and, after the inside air had been sufficiently replaced by nitrogen, sealed. The container was kept standing in a constant-temperature constant-humidity oven at 35° C., 75% RH for 60 days and then opened. The contents were tasted by 5 panelists. The moisture-proofness was judged based on the feeling of resistance to the teeth and the food storing capability based on the flavor and color.

An average of the 5 panelists was taken as the evaluation result.

The results of the above evaluations were expressed in terms of the following rating.

⊚: excellent
○: good
△: a little poor
x: poor

Example 1

A Hastelloy C autoclave was charged with 20 parts by weight of a carbon monoxide-ethylene alternating copolymer (CO content: 50 mole %) synthesized with the catalyst comprising palladium acetate/1,3-bis[bis(2-methoxyphenyl) phosphino]propane/p-toluenesulfonic acid described in Japanese Patent Application Laid-open No. 225027/1992 (U.S. Pat. No. 5,138,032), 0.3 part by weight of ruthenium acetylacetonate, 0.8 part by weight of tri(n-octyl)phosphine, 0.05 part by weight of phosphoric acid and 150 parts by weight of a 80/20 by volume mixture of methanol and water, and sealed. After the inside air had been replaced by hydrogen at room temperature, hydrogen was further introduced under pressure to an inside pressure of 110 atm. The autoclave was heated with stirring to an inside temperature of 110° C., and the heating with stirring was continued for 4 hours. Then, after the inside temperature had been elevated to 180° C., hydrogen was added to an inside pressure of 160 atm and the heating with stirring was continued for 20 hours.

The autoclave was allowed to cool and the pressure released, and then the autoclave was opened. The contents were withdrawn into acetone, to give a solid PAL. The conversion of carbonyl groups was 100%. The properties of the PAL were as shown in Table 1.

The PAL was formed, by direct blow molding, into single-layer blow molded containers, while the extrusion conditions were set such that the obtained containers had a body wall thickness of 700 μm. Here, the die temperature on the molding was set at 180° C., and hot water of 50° C. was circulated to the blow mold so that gradual cooling was effected.

Example 2

Direct blow molding was conducted using the PAL obtained in Example 1 as an intermediate layer, a polypropylene (Type B200, made by Mitsui Petrochemical Industries, Ltd.; vicat softening point: 155° C./ASTM D1525, load 1 kg) as inner and outer layers, and a maleic anhydride-graft modified polypropylene (ADMER QB540, made by Mitsui Petrochemical Industries, Ltd.) to be placed between the above layers, to obtain 3 kind/5 layer containers. The extrusion conditions were set such that the thickness construction at their body part became (outer layer) PP (300 μm) /modified PP (20 μm)/PAL(20 μm)/modified PP(20 μm)/PP(340 μm) (inner layer) (total thickness: 700 μm). The die temperature was set at 210° C., and hot water of 50° C. was circulated to the mold to effect gradual cooling.

Example 3

The procedure of Example 1 was followed except that a carbon monoxide-ethylene alternating copolymer copolymerized with 4 mole % of propylene (CO content: 50 mole %) obtained in accordance with the process described in Japanese Patent Application Laid-open No. 225027/1992 was used instead of the carbon monoxide-ethylene alternating copolymer used in Example 1, to obtain an alternating PAL copolymerized with propylene.

The PAL was formed into single-layer blow molded containers in the same manner as in Example 1.

Example 4

The PAL obtained in Example 3 was formed into 3-kind/5-layer blow molded containers in the same manner as in Example 2.

Example 5

An autoclave was charged with 30 parts by weight of the same carbon monoxide-ethylene alternating copolymer (CO content: 50 mole %) as used in Example 1, 5 parts by weight of Raney cobalt as hydrogenation catalyst and 300 parts by weight of a 80/20 by volume mixture of methanol and water as reaction solvent, and sealed. After the inside air had been replaced by hydrogen at room temperature, hydrogen was further introduced under pressure to an inside pressure of 110 atm. The autoclave was heated with stirring to an inside temperature of 120° C., and the heating with stirring was continued for 4 hours. Then, after the inside temperature had been elevated to 160° C., hydrogen was added to an inside pressure of 160 atm and the heating with stirring was continued for 20 hours.

The autoclave was allowed to cool and the pressure released, and then the autoclave was opened. The contents were withdrawn into acetone, to give a solid PAL. The conversion of carbonyl groups was 100%. The properties of the PAL were as shown in Table 1.

The PAL was formed into single-layer blow molded containers, in the same manner as in Example 1.

Example 6

The PAL obtained in Example 5 was formed into 3-kind/5-layer blow molded containers in the same manner as in Example 2.

Example 7

A carbon monoxide-ethylene alternating copolymer (CO content: 50 mole %) synthesized using the catalyst comprising palladium acetate/1,3-bis(diphenylphosphino) propane/H [$B(OC_6H_4CO_2)_2$] described in Japanese Patent Application Laid-open No. 132629/1989 (U.S. Pat. No. 4,925,918) was, in accordance with the process described in Japanese Patent Application Laid-open No. 204929/1989, reduced by stirring under reflux for 24 hours in hexafluoroisopropanol with sodium borohydride, to yield a PAL. The product was subjected to structural analysis by NMR spectroscopy. It was found that the conversion of carbonyl groups was 100%. The properties of the PAL were as shown in Table 1.

The PAL was formed into single-layer blow molded containers, in the same manner as in Example 1.

Example 8

The PAL obtained in Example 7 was formed into 3-kind/5-layer blow molded containers in the same manner as in Example 2.

Example 9

Example 2 was repeated except that, instead of the polypropylene used as the inner layer and the modified polypropylene in Example 2, there were used, respectively, a low density polyethylene (PETROCENE 219; made by Toso Co.; melting point: 118° C., melt index: 3 g/10 min JIS K6760) and a maleic anhydride graft-modified linear low density polyethylene (ADMER NB550, made by Mitsui Petrochemical Industries, Ltd.), to obtain 3-kind/5-layer blow molded containers.

Example 10

The procedure of Example 2 was followed except that, there were used, instead of the polypropyene used as the inner layer and the modified polypropylene in Example 2, a polyethylene terephthalate-based polyester for direct blow molding (KURAPET KS710B; made by Kuraray Co., Ltd.) and a maleic anhydride graft-modified linear low density polyethylene (ADMER SF710, made by Mitsui Petrochemical Industries, Ltd.), respectively, to obtain 3-kind/5-layer blow molded containers.

Here, the die temperature during molding was set at 265° C., and hot water of 50° C. was circulated to the mold to effect gradual cooling.

Example 11

A polyethylene terephthalate (PET) having an intrinsic viscosity of 0.68 dl/g and a melting point of 255° C. was fed to a primary injection molding machine having a barrel temperature of 285° C., and the PAL obtained in Example 1 was fed to a secondary injection molding machine having a barrel temperature of 245° C. The two materials were co-injected, through a hot runner nozzle set at 280° C. and passing a mold gate, into a parison cavity having a temperature of 20° C., to yield multilayered parisons having the PAL as an intermediate layer and the PET as inner and outer layers. The parisons were then, after being conditioned to a temperature of 110° C. in a temperature conditioning pot, transferred to a blow mold. Immediately thereafter, the parisons were axially stretched two-fold with a stretching rod and, at the same time, radially stretched 3-fold by introducing a compressed air of 10 kg/cm$^2$ to fit them to the shape of the mold, and cooled, to yield 2-kind/3-layer co-injected stretched blow molded containers having a wall thickness construction at body part of (outer layer) PET (300 µm) /PAL (20 µm) /PET (380 µm) (inner layer) (total thickness: 700 µm).

Comparative Examples 1 and 2

Example 1 was repeated except that the PKs used were changed, to obtain PALs having different intrinsic viscosities. The obtained PALs were evaluated in the same manner as in Example 1.

The PAL obtained in Comparative Example 1 could not be molded easily into good parisons, while causing, during molding, severe drawdown and large thickness unevenness, so that the evaluation was thereafter stopped. The PAL obtained in Comparative Example 2 caused, during extrusion, a large load on the extruder and could not be molded into good parisons easily, with the resulting parisons having streaks and gels. The evaluation after blowing was therefore not conducted.

Comparative Example 3

Example 4 was repeated except that the ratio of copolymerization of propylene of the PAL used in Example 4 was changed to 7 mole % and the THF ring content of the PAL was also changed, to obtain a PAL. The obtained PAL was evaluated in the same manner as in Example 4.

Comparative Example 4

The containers obtained in Example 1 were treated by heating in a 1,9-nonanedial-containing 0.1N sulfuric acid at 80° C. for 3 hours, so that the melting point of the PAL was elevated. The resulting containers were evaluated in the same manner as in Example 1.

Comparative Example 5

The procedure of Example 2 was followed except that a carbon monoxide-ethylene-propylene random copolymer (CO:ethylene:propylene=50:45:5) obtained in accordance with the process described in Reference Example 1 of Japanese Patent Application Laid-open No. 232228/1990 was used, to obtain a PAL (random polymer) by reduction. The PAL was then evaluated in the same manner as in Example 2, except that, during molding, cool water of 20° C. was circulated through the blow mold.

Comparative Example 6

The procedure of Example 2 was followed except that parisons leaving the die was cooled with cool air so that, during blow molding, the resulting containers would have high degree of molecular orientation, and that cool water of 20° C. was circulated through the blow mold, to obtain containers. The obtained containers were then each placed in a separate mold for heat treatment and, while the inside of the container was pressurized with compressed air, heat treated at a mold temperature of 105° C. for 3 minutes.

Comparative Example 7

Example 6 was repeated except that the reaction solvent for reducing PK was changed to m-cresol and that the reaction conditions were changed to an internal pressure from start of 160 atm, a temperature of 190° C. and a reaction time of 24 hours, to obtain a PAL. The PAL was evaluated in the same manner as in Example 6.

Obviously, numerous modifications and variations of the invention are possible in light of the above teachings. It is therefore to be understood that within the scope of the appended claims, the invention may be practiced otherwise than as specifically described herein.

TABLE 1

| Starting material PK | Intrinsic viscosity dl/g | Melting point °C. | Density g/cm³ | THF ring content mole % | Oxygen transmission rate; cc/ m²·day·atm | Layer construction | Blow moldability | Appearance | Falling strength Low temp. | Falling strength High temp. | Moisture proofness | Food storing capability |
|---|---|---|---|---|---|---|---|---|---|---|---|---|
| Ex. 1 | CO/ET | 1.10 | 142 | 1.17 | 2.5 | 0.1 or below | Single layer | ⊚ | ○ | ○ | ○ | ○ | ⊚ |
| Ex. 2 | " | 1.10 | 142 | 1.19 | 2.5 | 1.2 | PP/AD/PAL/AD/PP | ⊚ | ⊚ | ⊚ | ⊚ | ⊚ | ⊚ |
| Ex. 3 | CO/ET/P | 0.90 | 125 | 1.15 | 4.5 | 0.2 | Single layer | ○ | ○ | ⊚ | ○ | ○ | ⊚ |
| Ex. 4 | " | 0.90 | 125 | 1.15 | 4.5 | 6.8 | PP/AD/PAL/AD/PP | ○ | ○ | ⊚ | ⊚ | ⊚ | ○ |
| Ex. 5 | CO/ET | 1.14 | 138 | 1.17 | 2.8 | 0.1 or below | Single layer | ⊚ | ○ | ○ | ○ | ○ | ⊚ |
| Ex. 6 | " | 1.14 | 138 | 1.18 | 2.8 | 1.5 | PP/AD/PAL/AD/PP | ⊚ | ⊚ | ⊚ | ⊚ | ⊚ | ⊚ |
| Ex. 7 | " | 1.15 | 145 | 1.17 | 1.0 | 0.1 or below | Single layer | ⊚ | ○ | ○ | ○ | ○ | ⊚ |
| Ex. 8 | " | 1.15 | 145 | 1.19 | 1.0 | 0.8 | PP/AD/PAL/AD/PP | ⊚ | ⊚ | ⊚ | ⊚ | ⊚ | ⊚ |
| Ex. 9 | " | 1.10 | 142 | 1.19 | 2.5 | 1.2 | PP/AD/PAL/AD/PE | ⊚ | ⊚ | ⊚ | ⊚ | ⊚ | ⊚ |
| Ex. 10 | " | 1.10 | 142 | 1.19 | 2.5 | 1.1 | PES/AD/PAL/AD/PES | ⊚ | ⊚ | ⊚ | ⊚ | ⊚ | ⊚ |
| Ex. 11 | " | 1.10 | 142 | 1.20 | 2.5 | 1.0 | PET/PAL/PET | ⊚ | ⊚ | ○ | ○ | ⊚ | ⊚ |
| Comp. Ex.1 | CO/ET | 0.25 | 142 | 1.17 | 2.5 | — | Single layer | x | — | — | — | — | — |
| Comp. Ex. 2 | " | 3.21 | 143 | 1.17 | 2.5 | — | " | x | — | — | — | — | — |
| Comp. Ex. 3 | " | 1.10 | 105 | 1.12 | 7.0 | 30 | PP/AD/PAL/AD/PP | Δ | Δ | Δ | x | x | Δ |
| Comp. Ex. 4 | " | 1.10 | 165 | 1.15 | 1.5 | 0.1 or below | Single layer | ○ | ⊚ | x | Δ | ○ | ⊚ |
| Comp. Ex. 5 | CO/Et/P | 1.11 | — | 1.11 | 2.8 | 55 | PP/AD/PAL/AD/PP | ⊚ | ⊚ | ○ | Δ | Δ | x |
| Comp. Ex. 6 | CO/ET | 1.10 | 143 | 1.23 | 1.5 | 0.8 | " | ⊚ | ⊚ | x | x | ⊚ | ⊚ |
| Comp. Ex. 7 | " | 1.15 | 111 | 1.16 | 12 | 65 | " | x | x | ○ | x | x | x |

Notes CO: carbon monoxide, P: propylene, PP: polypropylene, AD: adhesive polymer, PE: polyethylene, PES: polyester

What is claimed is:

1. A blow molded container comprising a polyalcohol obtained by reduction of a polyketone comprising carbon monoxide-ethylene copolymer, said polyalcohol having an intrinsic viscosity of 0.3 to 3.0 dl/g, a melting point of 110° to 160° C., a density of 1.12 to 1.21 g/cm³ and a tetrahydrofuran ring content of not more than 10 mole %.

2. A blow molded multilayered container comprising a layer of a polyalcohol obtained by reduction of a polyketone comprising carbon monoxide-ethylene copolymer and a layer of a thermoplastic resin other than polyalcohol, said polyalcohol having an intrinsic viscosity of 0.3 to 3.0 dl/g, a melting point of 110° to 160° C., a density of 1.12 to 1.21 g/cm³ and a tetrahydrofuran ring content of not more than 10 mole %.

3. The blow molded multilayered container according to claim 2, further comprising a layer of an adhesive polymer between the layer of the polyalcohol and the layer of the thermoplastic resin.

4. The blow molded multilayered container according to claim 3, wherein said adhesive polymer is a polyolefin modified with an unsaturated carboxylic acid or its anhydride.

5. The blow molded multilayered container according to claim 2, wherein said thermoplastic resin other than polyalcohol is at least one resin selected from the group consisting of polyolefins and polyesters.

6. The blow molded container according to claim 1, wherein said tetrahydrofuran content is 0.01 to 10 mole %.

7. The blow molded multilayered container according to claim 2, wherein said tetrahydrofuran content is 0.01 to 10 mole %.

* * * * *